US010670418B2

(12) United States Patent
Breedvelt-Schouten et al.

(10) Patent No.: US 10,670,418 B2
(45) Date of Patent: Jun. 2, 2020

(54) VIDEO BASED ROUTE RECOGNITION

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/145,876

(22) Filed: May 4, 2016

(65) Prior Publication Data

US 2017/0322045 A1    Nov. 9, 2017

(51) Int. Cl.
*G01C 21/36*   (2006.01)
*G06K 9/62*    (2006.01)
*G06K 9/00*    (2006.01)

(52) U.S. Cl.
CPC ..... *G01C 21/3647* (2013.01); *G06K 9/00671* (2013.01); *G06K 9/00718* (2013.01); *G06K 9/6202* (2013.01)

(58) Field of Classification Search
CPC .......... G06K 9/00523; G06K 9/00577; G06K 9/00624; G06K 9/00671; G06K 9/00335;

(Continued)

(56) References Cited

U.S. PATENT DOCUMENTS 6,018,697 A  *  1/2000  Morimoto .............. G01C 21/34
                                                     701/411
6,449,384 B2 *  9/2002  Laumeyer .......... G06K 9/00818
                                                     382/104

(Continued)

FOREIGN PATENT DOCUMENTS

| JP | 2005067566 A  | 3/2005 |
| WO | 2004019601 A3 | 3/2004 |
| WO | 2015065418 A1 | 5/2015 |

OTHER PUBLICATIONS

Keng, Kah, "vqats/README at master • kahkeng/vqats • GitHub", Jun. 13, 2010, © 2016 GitHub, Inc., 1 page, <https://github.com/kahkeng/vqats/blob/master/README>.

(Continued)

*Primary Examiner* — Hunter B Lonsberry
*Assistant Examiner* — Luis A Martinez Borrero
(74) *Attorney, Agent, or Firm* — Stephen R. Yoder; Gilbert Harmon, Jr.

(57) ABSTRACT

As disclosed herein, a method for recognizing a previously-traveled route includes receiving recorded video data and a current video stream from one or more video capture devices, identifying one or more objects in the received video data to provide one or more recorded waypoints, identifying one or more visible objects in the received current video stream to provide one or more visible waypoints, comparing the visible waypoints to the recorded waypoints to provide one or more matching waypoints, and identifying a previously traveled path in the received current video stream corresponding to the one or more of the identified matching waypoints. A computer program product and computer system corresponding to the method are also disclosed.

20 Claims, 5 Drawing Sheets

(58) Field of Classification Search
CPC ........... G06K 9/00718; G06K 9/00832; G06K 9/00617; G06K 9/00604; G01C 21/34; G01C 21/20; G01C 21/3407; G01C 21/3492; G01C 21/32; G01C 17/38; G01C 21/36; G01C 21/3602; G01C 21/3626; G01C 21/3673; G01C 21/18; G01C 21/3647; G01C 21/3617; G01C 21/3632; G01C 21/3676
USPC .................. 701/36, 23, 28, 400, 41, 533
See application file for complete search history.

(56) References Cited

U.S. PATENT DOCUMENTS

| | | | |
|---|---|---|---|
| 6,459,987 B1 | 10/2002 | Krull et al. | |
| 7,590,310 B2* | 9/2009 | Retterath | G06K 9/3233 382/305 |
| 7,627,420 B2* | 12/2009 | Ujino | G01C 21/20 340/995.1 |
| 7,898,437 B2* | 3/2011 | Okada | G01C 7/04 340/436 |
| 8,121,350 B2* | 2/2012 | Klefenz | G01C 21/00 348/148 |
| 8,682,531 B2* | 3/2014 | Miyajima | G01C 21/3647 701/28 |
| 8,750,567 B2* | 6/2014 | Zhang | G06T 7/181 382/103 |
| 8,751,156 B2* | 6/2014 | Musabji | G01C 21/3638 701/428 |
| 8,797,402 B2* | 8/2014 | Said | G01C 21/3632 348/119 |
| 10,234,294 B2* | 3/2019 | Kim | G01C 21/30 |
| 10,281,293 B2* | 5/2019 | Musabji | G01C 21/3638 |
| 2001/0056326 A1* | 12/2001 | Kimura | G01C 21/30 701/446 |
| 2003/0072471 A1* | 4/2003 | Otsuka | G05D 1/0246 382/103 |
| 2005/0216193 A1* | 9/2005 | Dorfman | G06Q 30/018 701/400 |
| 2005/0278111 A1* | 12/2005 | Ujino | G01C 21/20 701/440 |
| 2006/0004512 A1* | 1/2006 | Herbst | G06T 19/006 701/431 |
| 2006/0233424 A1* | 10/2006 | Miyajima | G06T 17/05 382/104 |
| 2006/0271286 A1* | 11/2006 | Rosenberg | G01C 21/3647 701/431 |
| 2007/0055441 A1 | 3/2007 | Retterath et al. | |
| 2008/0291217 A1* | 11/2008 | Vincent | G06T 17/05 345/629 |
| 2009/0088978 A1* | 4/2009 | Ishikawa | G01C 21/26 701/514 |
| 2010/0014714 A1* | 1/2010 | Zhang | G06K 9/00798 382/104 |
| 2010/0121561 A1* | 5/2010 | Kodaira | G01C 11/02 701/532 |
| 2012/0059720 A1* | 3/2012 | Musabji | G01C 21/3638 705/14.58 |
| 2012/0269382 A1* | 10/2012 | Kiyohara | G01C 21/26 382/103 |
| 2012/0288154 A1* | 11/2012 | Shima | G08G 1/167 382/103 |
| 2013/0101208 A1* | 4/2013 | Feris | G06K 9/00771 382/164 |
| 2013/0194426 A1* | 8/2013 | Schofield | B60R 1/00 348/148 |
| 2014/0219510 A1* | 8/2014 | Nagaoka | B60W 30/09 382/104 |
| 2014/0244159 A1* | 8/2014 | Musabji | G01C 21/3638 701/428 |
| 2015/0286868 A1* | 10/2015 | Flores | G06K 9/00651 382/103 |
| 2015/0371094 A1* | 12/2015 | Gardiner | E01C 23/01 348/148 |
| 2016/0162740 A1* | 6/2016 | Takemura | G06K 9/00791 348/148 |
| 2016/0170414 A1* | 6/2016 | Chen | G05D 1/0088 701/27 |
| 2016/0284125 A1* | 9/2016 | Bostick | G02B 27/0172 |

OTHER PUBLICATIONS

Roberts et al., "Vision-aided inertial navigation", Position Location and Navigation Symposium, 1990. Record. The 1990's—A Decade of Excellence in the Navigation Sciences. IEEE PLANS '90., IEEE, Mar. 20, 1990-Mar. 23, 1990, 8 pages.

Wikipedia, "Structural similarity", From Wikipedia, the free encyclopedia, last modified on Feb. 21, 2016, 3 pages, <https://en.wikipedia.org/wiki/Structural_similarity>.

"Skully AR-1 Augmented Reality Helmet", printed on Mar. 1, 2016, © Copyright 2015—Skully, Inc., 2 pages, <http://www.skully.com/#smartest-helmet>.

* cited by examiner

VIDEO BASED ROUTE RECOGNITION

BACKGROUND OF THE INVENTION

The present invention relates generally to the field of route identification, and more specifically to identifying a route according to previously recorded video content.

Route identification has become a common application of many computer systems. Dedicated GPS systems can provide a user with multiple paths between two user selected points, and computer systems such as smartphones and tablets are incorporating the same technology to allow users constant access to such features. The ability to identify possible routes can save a user valuable time when trying to travel from place to place. In some instances, a user may be interested in taking the fastest path as determined by a GPS device. In other cases, a user may have a particular interest in traveling via an exact path he or she has taken before.

SUMMARY

As disclosed herein, a method for recognizing a previously-traveled route includes receiving recorded video data and a current video stream from one or more video capture devices, identifying one or more objects in the received video data to provide one or more recorded waypoints, identifying one or more visible objects in the received current video stream to provide one or more visible waypoints, comparing the visible waypoints to the recorded waypoints to provide one or more matching waypoints, and identifying a previously traveled path in the received current video stream corresponding to the one or more of the identified matching waypoints. A computer program product and computer system corresponding to the method are also disclosed.

DETAILED DESCRIPTION

Humans are very good at pattern recognition and recognizing places that they have seen before. However, these abilities work best when viewing objects or places from a similar perspective. When retracing a route, a person is now seeing a location from the opposite perspective from where they previously viewed, and things may look quite different. Existing solutions for route retracing rely on the availability of GPS technology. Even when these services are available, these solutions may not provide location information that is precise enough to differentiate between two parallel footpaths, and may therefore be unable to exactly retrace the user's path.

Figure 1:
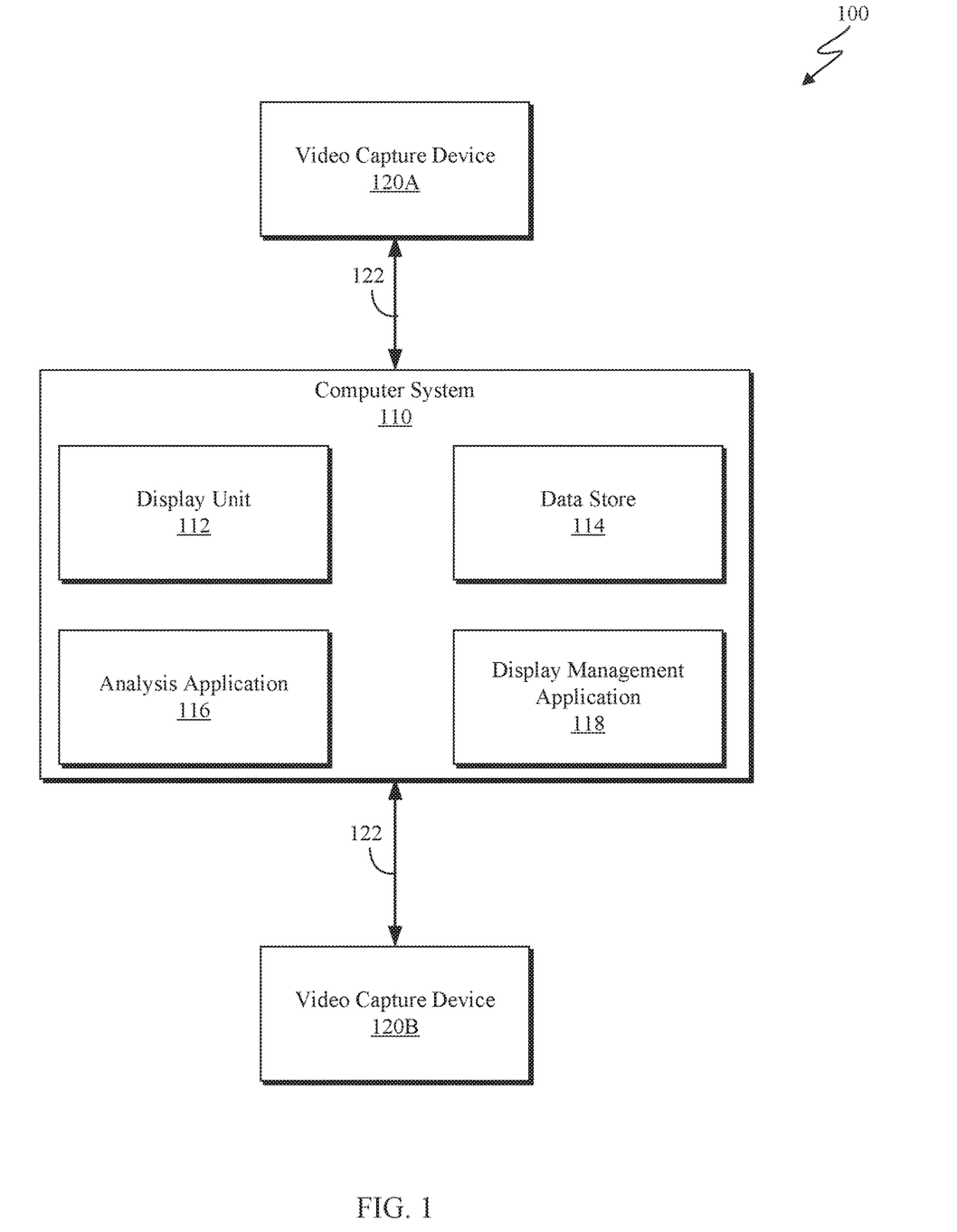
FIG. 1 is a block diagram depicting one embodiment of a route recognition system in accordance with some embodiments of the present invention.

FIG. 1 is a block diagram depicting one embodiment of a route recognition system 100 in accordance with some embodiments of the present invention. As depicted, route recognition system 100 includes a computer system 110 and cameras 120. Route recognition system 100 may enable identification of a route based on video content corresponding to a user's previously traveled path.

Computer system 110 may be a wearable device capable of executing machine-readable program instructions. As depicted, computer system 110 includes a display unit 112, a data store 114, an analysis application 116, and a display management application 118. In general, computer system 110 is representative of any electronic devices, or combination of electronic devices, capable of executing machine-readable program instructions, as described in greater detail with respect to FIG. 4.

Display unit 112 provides a mechanism to display data to a user. In one embodiment, display unit 112 is a transparent screen through which a user is able to see a path ahead. The transparent screen may be configured to display indicators identifying which direction a user travelled previously. In another embodiment, display unit 112 is a screen configured to display a live feed from a video capture device 120. For example, display unit 112 may be configured to display the live feed as created by a forward facing camera fixed on a helmet or visor to be worn by a user. In this embodiment, the display unit 112 may be configured to display indicators identifying which direction the user travelled previously. In general, display unit 112 is configured to display a live camera view.

Data store 114 may be configured to store video content 122. In some embodiments, data store 114 is configured to store waypoint data associated with the video content 122. Data store 114 may be any non-volatile storage media known in the art. For example, data store 114 can be implemented with a tape library, optical library, one or more independent hard disk drives, or multiple hard disk drives in a redundant array of independent disks (RAID). Similarly, data on data store 114 may conform to any suitable storage architecture known in the art, such as a file, a relational database, an element-oriented database, and/or one or more tables.

Analysis application 116 may be configured to receive video content 122 from video capture devices 120. In at least one embodiment, analysis application 116 is configured to process video content 122 to identify landmark objects corresponding to a user's previously traveled path. Analysis application 116 may be configured to execute a route recognition method such as the one discussed with respect to FIG. 2.

Display management application 118 may be configured to receive instructions from analysis application 116. The instructions may indicate to display management application 118 to display a notification element or indicator on a path relating to one or more identified objects.

Video capture devices 120 may be any means known in the art capable of recording video content. In one embodiment, video capture devices 120 may be cameras configured to capture video content 122 corresponding to a user's traveled path. For example, video capture device 120A may correspond to a front-facing camera and video capture device 120B may correspond to a rear-facing camera. In one or more embodiments, video capture devices 120 are affixed to a helmet or other headwear item to be worn by a user. In said embodiments, video capture device 120A may be affixed on the front of the helmet, and video capture device 120B may be affixed on the back of the helmet. Video capture devices 120 may be configured to provide video content 122 to computer system 110 for processing.

Figure 2:
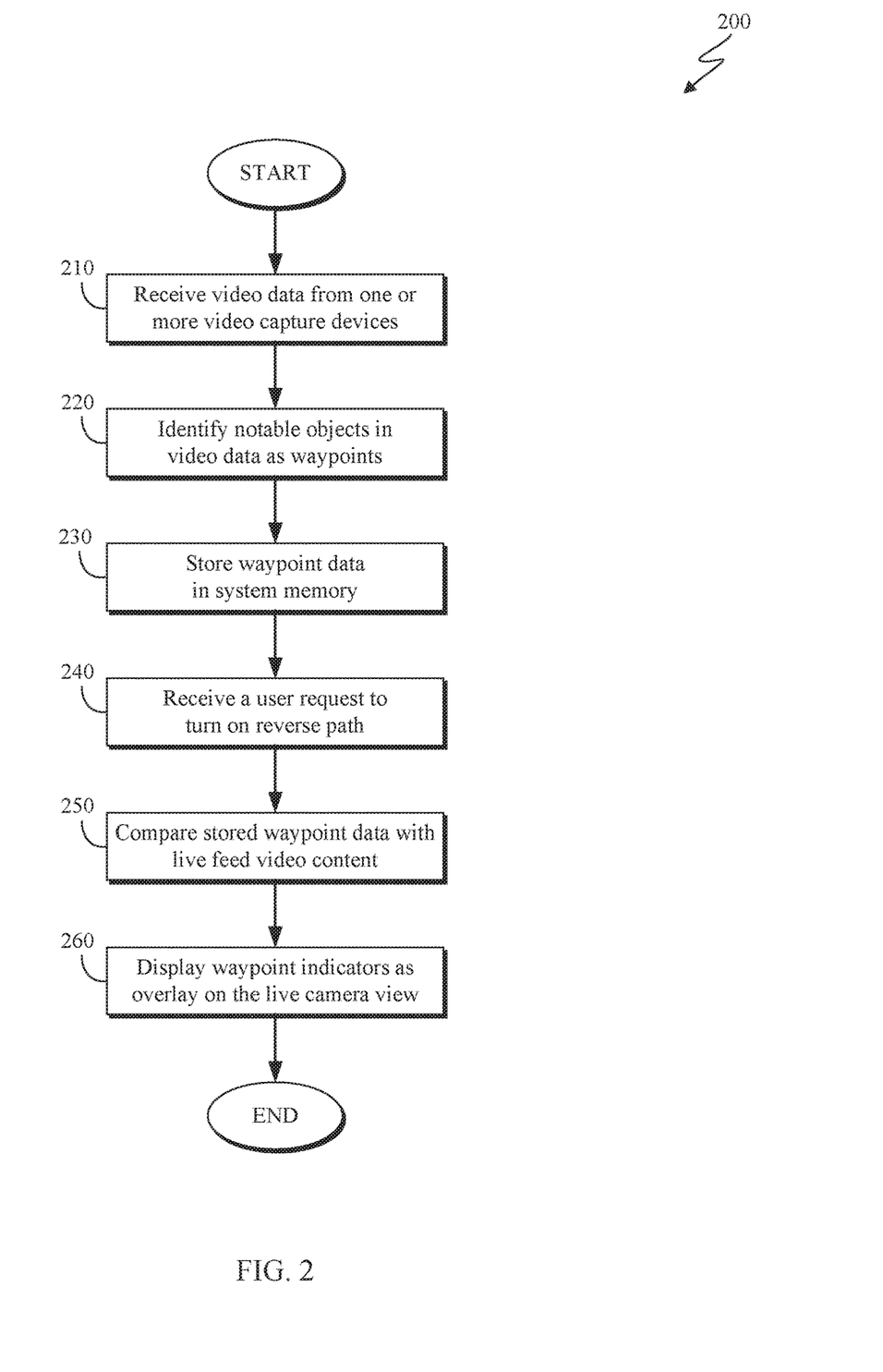
FIG. 2 is a flowchart depicting one embodiment of a route recognition method in accordance with at least one embodiment of the present invention.

FIG. 2 is a flowchart depicting one embodiment of a route recognition method 200 in accordance with at least one embodiment of the present invention. As depicted, route recognition method 200 includes receiving (210) video data from one or more video capture devices, identifying (220) notable objects in the video data as waypoints, storing (230) waypoint data in memory, receiving (240) a user request to switch to reverse path, comparing (250) stored waypoint data with live feed video content, and displaying (260) route indicators as overlay on the live camera view. Route recognition method 200 may enable identification of a previously traveled route based on video footage associated with the previous route.

Receiving (210) video data from one or more video capture devices may include receiving video content as captured by one or more video capture devices. In at least one embodiment, the one or more video capture devices correspond to at least one front facing camera and at least one rear facing camera. The front facing camera and the rear facing camera may be affixed to a helmet or visor worn by a user. In said embodiment, receiving (210) video data also includes tagging the received video data to indicate which video capture device (i.e., which of the front facing camera and the rear facing camera) provided the video data.

Identifying (220) notable objects in the video data as waypoints may include utilizing existing object recognition techniques to identify objects in the video data. Utilized object recognition techniques may include, but are not limited to, appearance-based methods (such as edge matching or greyscale matching), feature based methods (such as interpretation trees or pose clustering), gradient histograms, and template matching. In some embodiments, to minimize processing requirements, identifying (220) notable objects occurs until a certain maximum number of objects are identified per frame. In other embodiments, identifying (220) notable objects occurs until all identifiable objects in a frame have been identified. The identified objects in each frame may henceforth be referred to as waypoints.

Storing (230) waypoint data in memory may include providing the identified waypoints to a data store. The data corresponding to the identified waypoints may conform to any suitable storage architecture known in the art, such as a file, a relational database, an element-oriented database, and/or one or more tables. In one or more embodiments, storing (230) the identified waypoints comprises storing image stills from the video content with the waypoints identified in the stills.

Receiving (240) a user request to switch to reverse path may include receiving a user initiated request to begin processing a reverse path. For example, a user may decide he needs to retrace his previously travelled path, and may not recall which direction he traveled. In this example, a graphical user interface may be provided to the user to enable the user to request that the system display an indicator corresponding to a previously travelled path. The request may be provided to a computer system capable of processing video data provided by the video capture devices.

Comparing (250) stored waypoint data with live feed video content may include analyzing a live video feed from a front facing video capture device to identify waypoints corresponding to the live video as viewed by a user. The identified live video waypoints may then be compared to the stored waypoint data corresponding to previously captured footage. For example, in one embodiment, the waypoints corresponding to live footage from a front facing camera are compared to the waypoints corresponding to previously captured video content from a rear facing camera. Comparing (250) stored waypoint data with live feed video content may include comparing object recognition data associated with the stored waypoints with object recognition data associated with waypoints in the live video feed. In one or more embodiments, comparing (250) stored waypoint data with live feed video content includes determining which waypoints in the live video feed match waypoints from the stored video content to provide one or more waypoints of interest.

Displaying (260) route indicators as overlay on the live camera view may include identifying a path on the live video feed associated with the waypoints of interest. For example, if there are two or more paths in the live video feed, the identified path may correspond to the path that is nearest to the waypoints of interest. Displaying (260) route indicators may further include displaying arrows or some other indication of direction to the user via the live video feed. For example, if the live video feed is displayed to a user via a display screen, displaying (260) route indicators may comprise overlaying arrows or other indicators on the appropriate path. In one or more embodiments, identifying a path on the live video feed may include calculating a distance between the one or more identified matching waypoints and each of the currently displayed paths. The distance between a waypoint and a displayed path may be calculated with respect to the pixel count between the waypoint and the path. In said embodiments, identifying a path may further include selecting the path corresponding to the smallest calculated distance to the identified one or more matching waypoints.

Figure 3A:
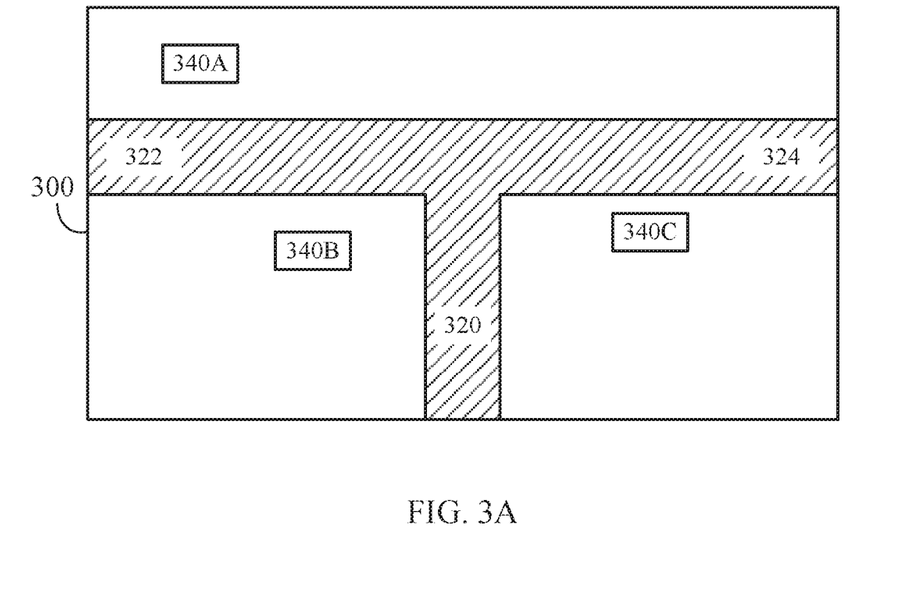
FIG. 3A depicts an example field of view corresponding to a heads up display in accordance with one embodiment of the present invention.

FIG. 3A depicts an example field of view 300 corresponding to a heads up display in accordance with one embodiment of the present invention. As depicted, field of view 300 includes a path 320, two forks in the path 322 and 324, and three identified objects 340. Field of view 300 is an example of a path that may be analyzed using a route identification method as viewed by a user.

Field of view 300 may correspond to a live video feed as provided by a camera affixed in a front facing direction with respect to a user. Field of view 300 may be displayed on a screen configured to display a live video feed. As depicted, field of view 300 includes an identified path 320. Path 320 may be recognized using aforementioned object recognition techniques. When it is determined a path splits into two separate identifiable forks in the path, as path 320 splits into forks 322 and 324, objects corresponding to each of the forks may be identified using the aforementioned object recognition techniques. With respect to the depicted example and field of view 300, objects 340 have been identified as potential waypoints because they fall along the forks in the path 322 and 324.

Figure 3B:
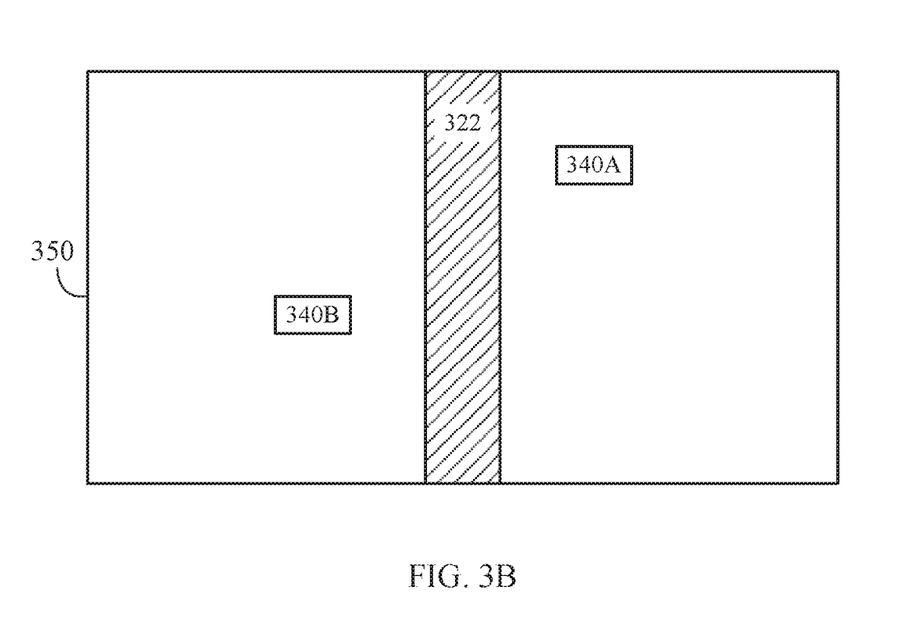
FIG. 3B depicts an example image corresponding to previously recorded video content in accordance with one embodiment of the present invention.

FIG. 3B depicts an example image 350 corresponding to previously recorded video content in accordance with one embodiment of the present invention. As depicted, example image 350 includes path branch 322 and two objects 340A and 340B. Image 350 may correspond to a still image, taken from previously recorded and stored video content, that corresponds to a previously traveled route. In the depicted embodiment, the previously traveled route follows corresponds to path branch 322.

Image 350 may be identified by analyzing still frames corresponding to previously captured video content. The still frames may be analyzed using aforementioned object recognition techniques to identify potential waypoints. The identified potential waypoints in each of the still frames are then compared to the identified waypoints corresponding to the field of view 300 corresponding to the live video feed as discussed with respect to FIG. 3A. To compare these waypoints, the data utilized in the object recognition process may be analyzed and compared to determine if the waypoints in still frame 350 match any of the waypoints in field of view 300. For example, if a gradient matching object recognition technique is utilized, pixel distances may be computed as a function of both pixel position and pixel intensity, with respect to a pixel corresponding to a potential waypoint. These pixel distances may be calculated for objects in image 350 and objects in field of view 300, and these distances may be compared to determine if any of the objects in image 350 match any of the waypoints in field of view 300.

Figure 3C:
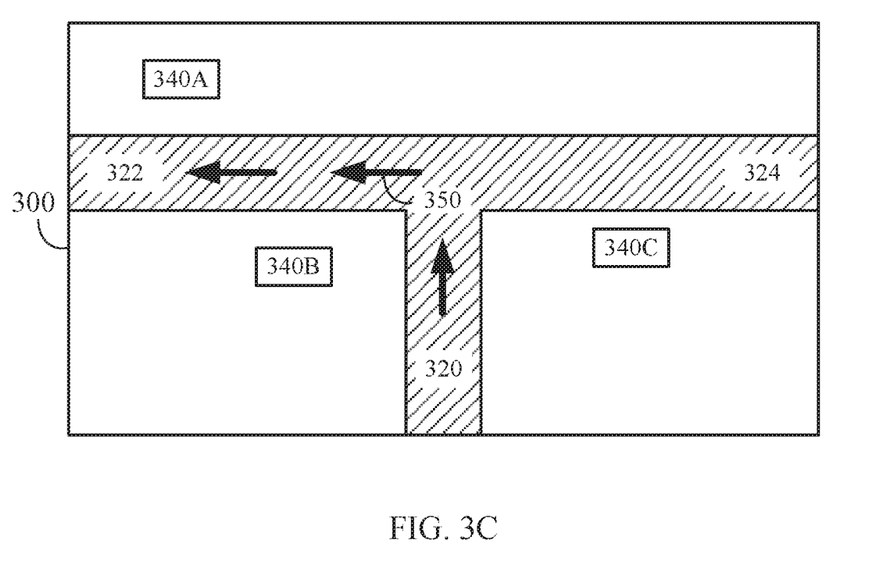
FIG. 3C depicts an example field of view corresponding to a heads up display with a route indicator overlay in accordance with one embodiment of the present invention.

FIG. 3C depicts an example field of view 300 with a route indicator overlay in accordance with one embodiment of the present invention. As depicted, FIG. 3C includes the same field of view 300 as FIG. 3A (including path 320, branches 322 and 324, and objects 340), but also includes overlay indicators 350. In the depicted embodiment, the overlay indicators 350 are arrows displayed along an identified path of interest.

With respect to the embodiment depicted in FIG. 3C, it is determined that branch 322 corresponds to the path the user previously traveled. This determination is made based on the appearance of the objects 340 corresponding to branch 322 appearing in previously captured video footage corresponding to the user's route. As discussed with respect to FIG. 3B, object recognition techniques determined that objects 340A and 340B appear in the previously captured video footage, indicating that the user had traveled along the route associated with these objects previously. With respect to field of view 300 in FIG. 3C, path branch 322 is the route associated with objects 340A and 340B, therefore path branch 322 is identified and displayed as the path the user should now take via the indicators 350.

Figure 4:
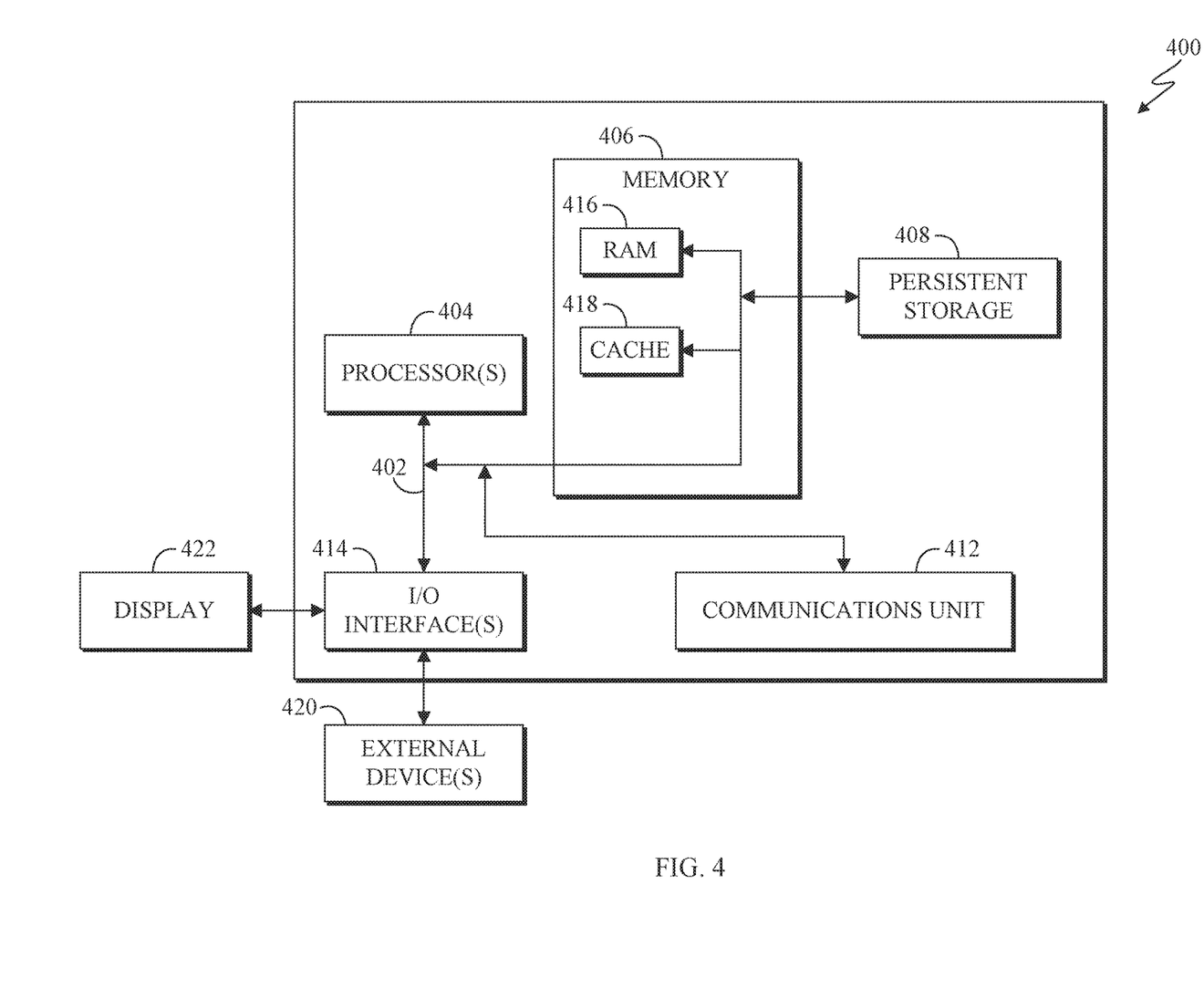
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for enabling a user to retrace at least a portion of a path the user has traveled, the method comprising:
   affixing at least one video camera to a user, wherein the at least one video camera captures front-facing video images in front of the user and rear-facing video images behind the user;
   storing a stream of the rear-facing video images at least while the user is moving, such that the rear-facing video images provide a recording of a path the user has traveled;

receiving, by one or more computer processors, an indication that the user wishes to retrace at least a portion of the path the user has traveled;

processing a current video stream and the previously recorded video data to identify one or more objects within the current video stream which are also depicted in the stored rear-facing video images;

identifying the path previously traveled by the user in the current video stream according to the one or more identified objects, wherein the path previously traveled by the user is a path within the current video stream which is closer to the one or more identified objects than any other depicted paths; and generating a display overlay corresponding to the current video stream, wherein the display overlay indicates the path previously traveled by the user relative to the one or more identified objects.

2. The method of claim 1, further comprising displaying one or more indicators on a display indicating the path previously traveled by the user to the user.

3. The method of claim 1, wherein the at least one video camera is affixed to a user's helmet.

4. The method of claim 1, wherein identifying a previously traveled path in the current video stream according to the one or more identified objects occurs responsive to receiving a user request to identify a previously traveled path.

5. The method of claim 1, further comprising identifying one or more previously traveled paths corresponding to the current video stream.

6. The method of claim 5, wherein identifying a previously traveled path in the current video stream corresponding to the one or more identified objects comprises calculating a distance between the one or more identified objects and one or more currently displayed paths.

7. The method of claim 6, wherein identifying a path previously traveled by the user in the current video stream comprises selecting a path corresponding to the smallest calculated distance to the one or more identified objects.

8. A computer program product for enabling a user to retrace at least a portion of a path the user has traveled, the computer program product comprising:

one or more computer readable storage media and program instructions stored on the one or more computer readable storage media, the program instructions comprising instructions to:

receive previously recorded video data corresponding to a rear facing camera affixed to a user, wherein the previously recorded video data depicts a path previously traveled by the user;

receive a current video stream corresponding to a front facing camera affixed to a user;

detect a change in direction of the user corresponding to the current video stream relative to the previously recorded video data;

process the current video stream and the previously recorded video data to identify one or more objects within the current video stream which are also depicted in the previously recorded video data;

identify a previously traveled path in the current video stream according to the one or more identified objects, wherein the previously traveled path is a path within the current video stream which is closer to the one or more identified objects than any other depicted paths; and generate a display overlay corresponding to the current video stream, wherein the display overlay indicates the previously traveled path relative to the one or more identified objects.

9. The computer program product of claim 8, further comprising instructions to display one or more indicators on a display indicating the previously traveled path to a user.

10. The computer program product of claim 8, wherein the front facing camera and the rear facing camera are affixed to a user's helmet.

11. The computer program product of claim 8, wherein identifying a previously traveled path in the current video stream according to the one or more identified objects occurs responsive to receiving a user request to identify a previously traveled path.

12. The computer program product of claim 8, further comprising instructions to identify one or more previously traveled paths corresponding to the current video stream.

13. The computer program product of claim 12, wherein instructions to identify a previously traveled path in the current video stream corresponding to the one or more identified objects comprise instructions to calculate a distance between the one or more identified objects and one or more currently displayed paths.

14. The computer program product of claim 13, wherein instructions to identify a previously traveled path in the current video stream comprise instructions to select a path corresponding to the smallest calculated distance to the one or more identified objects.

15. A computer system for enabling a user to retrace at least a portion of a path the user has traveled, the computer system comprising:

one or more computer processors;

one or more computer-readable storage media;

program instructions stored on the computer-readable storage media for execution by at least one of the one or more processors, the program instructions comprising instructions to:

receive previously recorded video data corresponding to a rear facing camera affixed to a user, wherein the previously recorded video data depicts a path previously traveled by the user;

receive a current video stream corresponding to a front facing camera affixed to a user;

detect a change in direction of the user corresponding to the current video stream relative to the previously recorded video data;

process the current video stream and the previously recorded video data to identify one or more objects within the current video stream which are also depicted in the previously recorded video data;

identify a previously traveled path in the current video stream according to the one or more identified objects, wherein the previously traveled path is a path within the current video stream which is closer to the one or more identified objects than any other depicted paths; and generate a display overlay corresponding to the current video stream, wherein the display overlay indicates the previously traveled path relative to the one or more identified objects.

16. The computer system of claim 15, further comprising instructions to display one or more indicators on a display indicating the previously traveled path to a user.

17. The computer system of claim 15, wherein identifying a previously traveled path in the current video stream according to the one or more identified objects occurs responsive to receiving a user request to identify a previously traveled path.

18. The computer system of claim 15, further comprising instructions to identify one or more previously traveled paths corresponding to the current video stream.

19. The computer system of claim 18, wherein instructions to identify a previously traveled path in the received current video stream corresponding to the one or more identified objects comprise instructions to calculate a distance between the one or more identified objects and one or more currently displayed paths.

20. The computer system of claim 19, wherein instructions to identify a previously traveled path in the received current video stream comprise instructions to select the path corresponding to the smallest calculated distance to the one or more identified objects.

* * * * *